United States Patent [19]

Hill

[11] Patent Number: 4,466,002
[45] Date of Patent: Aug. 14, 1984

[54] VARIABLE RELUCTANCE POSITION TRANSDUCER

[75] Inventor: William F. Hill, Stafford, England

[73] Assignee: Lucas Industries Limited, Birmingham, England

[21] Appl. No.: 349,470

[22] Filed: Feb. 17, 1982

[30] Foreign Application Priority Data

Feb. 18, 1981 [GB] United Kingdom ............... 8105148

[51] Int. Cl.³ .................. G08G 19/06; G08G 19/12; G01B 7/14
[52] U.S. Cl. .............................. 340/870.31; 324/174; 324/208; 340/672
[58] Field of Search ............... 340/870.31, 870.32, 340/672; 324/207, 208, 174; 310/168; 328/1

[56] References Cited

U.S. PATENT DOCUMENTS 3,832,635 8/1974 Cass ........................... 324/174
3,930,201 12/1975 Ackermann et al. ............... 324/208
4,013,945 3/1977 Grosso ............................ 324/208
4,039,946 8/1977 Nola ............................. 324/174
4,072,893 2/1978 Huwyler .......................... 324/208
4,262,251 4/1981 Fujishiro et al. ................ 324/208
4,305,072 12/1981 Makita ......................... 340/870.31

Primary Examiner—James J. Groody

[57] ABSTRACT

A transducer includes a winding in a magnetic circuit including a magnet, a pole-piece and a disc which has pairs of protuberances in its periphery, each pair being connected by a web of lesser radial distance from the disc axis than the peaks of the protuberances. The winding is connected in a discriminating circuit including an integrator which integrates the winding output, and a zero crossing detector. An output circuit receives signals from the integrator and the zero crossing detector and produces an output signal for the whole period during which the web between two protuberances is passing the pole piece.

10 Claims, 6 Drawing Figures

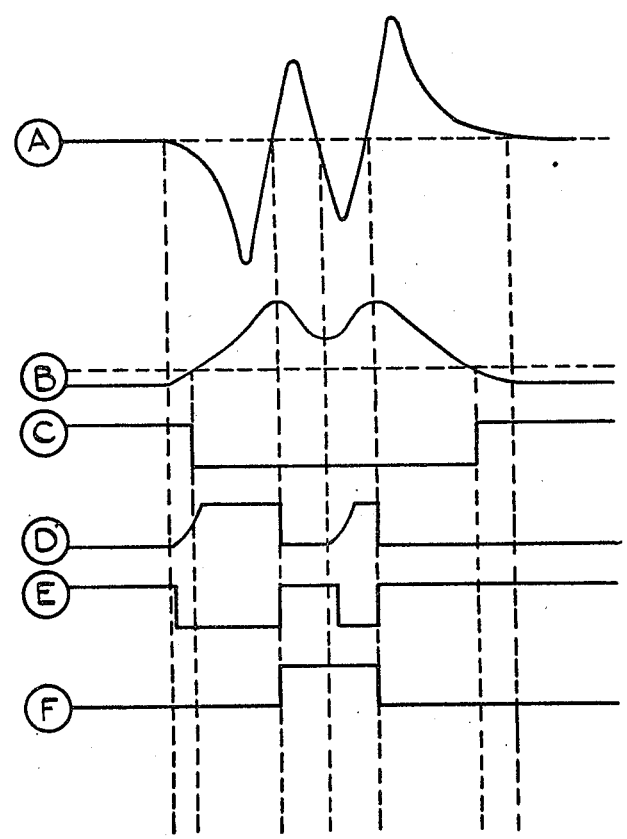
FIG.4.
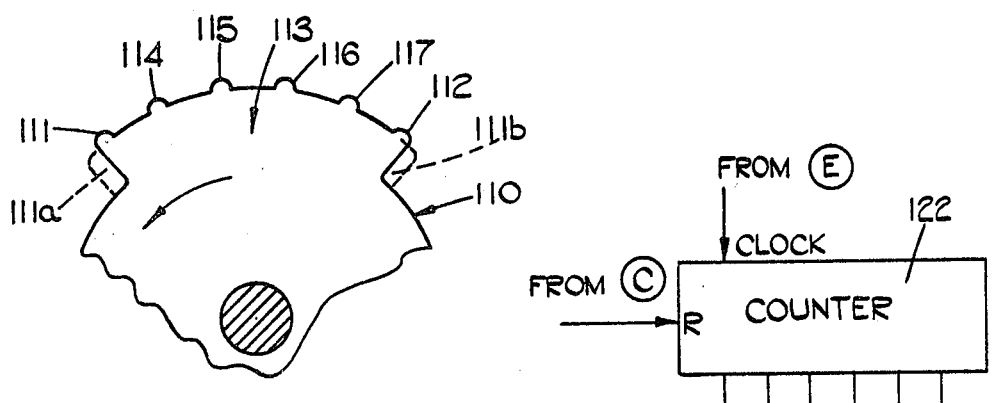
FIG.5.
FIG.6.

VARIABLE RELUCTANCE POSITION TRANSDUCER

This invention relates to a position transducer of the variable reluctance type.

There is a requirement, such as in an internal combustion engine spark ignition system such as that described in U.K. patent specification No. 1,482,626 for a position transducer which produces a d.c. output which is "high" when a shaft or other member is between two specific positions. Various types of transducers have previously been proposed for use in this sort of situation including optical transducers and magnetic transducers utilizing Hall-effect devices. None of these, however, are entirely satisfactory in terms of durability and accuracy.

Variable reluctance type transducers are both durable and capable of high accuracy at low cost, but conventional transducers of this type are useful only for indicating when a shaft or other member is at a specific position, rather than between two specific positions. Thus with a conventional variable reluctance type transducer it would be difficult to provide a d.c. output which is high when the shaft or other member is between two specific positions.

It is an object of the present invention to provide a variable reluctance transducer in which this difficulty is overcome.

A variable reluctance transducer in accordance with the invention comprises a source of magnetic flux, a winding linked with said source in a magnetic circuit which includes a pole piece and a relatively movable part, said relatively movable part having a surface, at least one pair of protuberances on said surface spaced apart in the direction of movement of the relatively movable part, and a web of height less than that of the protuberances interconnecting the protuberances, and a discriminating circuit to which said winding is connected, said discriminating circuit including integrating means to which the output of the winding is applied and gating means connected to said integrating means and operating to distinguish between signals produced in the winding when a protuberance passes the pole piece preceded by the web and followed by the web.

The movable member may be in the form of a disc shape so that said surface, said protuberances and said web form the edge of the disc. When the disc is intended for use inside the ignition distributor of an internal combustion engine it has a number of pairs of protuberances corresponding to the number of cylinders of the engine.

Additional protuberances may be provided on the webbed part of said relatively movable part. In this case, the discriminating circuit may include a counter connected to count the pulses produced as the protuberances pass the pole piece.

An example of the invention is shown in the accompanying drawings in which:

FIG. 4 is a graph showing voltage waveforms at various points in FIG. 3, FIG. 5 is a view showing a modified disc, and FIG. 6 is a view showing a modification to FIG. 3 for using the disc of FIG. 5.

Figure 1:
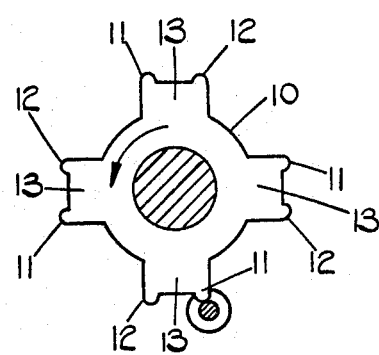
FIG. 1 is a view of a disc used in the transducer.
Figure 2:
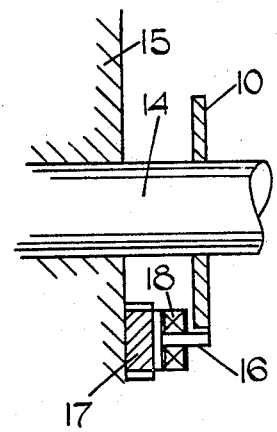
FIG. 2 is a section showing the magnetic circuit of which the disc of FIG. 1 forms a part.

The disc shown in FIG. 1 is intended for use in the ignition distributor of a four cylinder four-stroke internal combustion engine. The disc has an edge surface 10 with pairs of protuberances 11, 12 each such pair being joined by a web 13 of height less than that of the protuberances.

The disc is mounted on the distributor shaft 14 which, together with an end wall 15 of the distributor, the disc and a pole piece 16 forms a magnetic circuit. The pole piece 16 is in the form of a peg with a flange attached to the end wall 15 by a suitable permanent magnet 17. The pole piece 16 is arranged so as to be parallel with the axis of the shaft 14 and at a position such that it just clears the protuberances 11, 12 as the shaft 14 rotates. A winding 18 is mounted on the pole piece 16 so that a voltage is induced in the winding 18 as the shaft rotates owing to the changing reluctance of the magnetic circuit as the air gap between the pole piece and the edge profile of the disc varies. FIG. 4A shows the waveform of this voltage during the passage of one pair of the protuberances 11, 12 past the pole piece 16.

Figure 3:
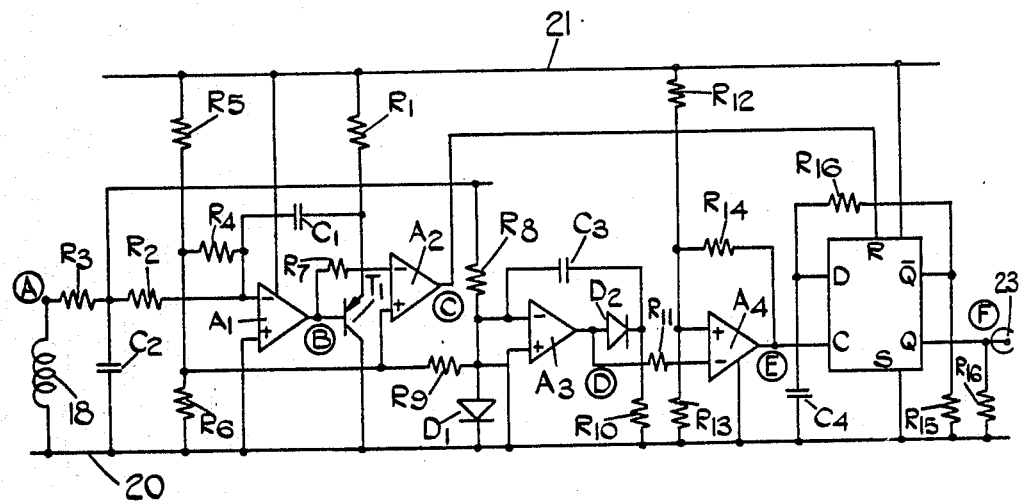
FIG. 3 is the circuit diagram of which a winding linked to the magnetic circuit of FIG. 2 forms a part.

Turning now to FIG. 3, the circuit shown therein includes an operational amplifier $A_1$ connected to operate as an integrator. The amplifier $A_1$ has its output connected to the base of a pnp transistor $T_1$ having its collector connected to a negative supply rail 20 and its emitter connected by a resistor $R_1$ to a positive supply rail 21. The emitter of transistor $T_1$ is connected by an integrator capacitor $C_1$ to the inverting input of amplifier $A_1$, which input is connected by a resistor $R_2$ to the interconnection of a resistor $R_3$ and a capacitor $C_2$ connected across the winding 18 and forming a low-pass filter. One end of winding 18 is connected to the rail 20, as is one terminal of capacitor $C_2$. The non-inverting input of amplifier $A_1$ is connected to rail 20.

A low level bias current is supplied to the inverting input of amplifier $A_1$ via a resistor $R_4$ from a point on a resistor chain $R_5$, $R_6$ connected between rails 20 and 21. The resistors $R_5$ and $R_6$ are chosen so that the voltage at their interconnection is about 0.1V above the rail 20, and resistor $R_4$ has a high ohmic value compared with resistor $R_3$, so that this bias current has a negligible effect on the operation of amplifier $A_1$ as an integrator, the peak voltages produced by the coil 18 in use being of the range of 0.1V to 50V. The bias current has the effect, however, of driving the operational amplifier output slowly down to the negative rail 20 voltage during periods of quiescence.

A second operational amplifier $A_2$ has its inverting input connected by a resistor $R_7$ to the output of amplifier $A_1$ and its non-inverting input connected to the junction of resisistors $R_5$ and $R_6$. Amplifier $A_2$ acts as an inverting voltage comparator.

A third operational amplifier $A_3$ has its non-inverting input connected to rail 20 and its inverting input connected by a resistor $R_8$ to the junction of resistor $R_3$ with capacitor $C_2$, by a resistor $R_9$ to the junction of resistors $R_5$ and $R_6$ and by a diode $D_1$ to rail 20, the cathode of diode $D_1$ being connected to rail 20. A diode $D_2$ has its anode connected to the output of amplifier $A_3$ and its cathode connected by a resistor $R_{10}$ to rail 20 and by a capacitor $C_3$ to the inverting input of amplifier $A_3$. Resistor $R_9$ has the same effect as resistor $R_4$, i.e. it maintains the output of amplifier $A_3$ low in periods of quiescence. Amplifier $A_3$ acts as an overdriven fast integrator in respect of negative-going input signals in order to discriminate against H.F. interference spikes in the input signal, diode $D_1$ acting to limit the voltage at the inverting input when the amplifier $A_3$ is in saturation. When the input signal becomes positive, however, feedback via capacitor $C_3$ is prevented by diode $D_2$ so that amplifier $A_3$ then acts as a zero-crossing detector.

A fourth operational amplifier $A_4$ has its inverting input connected by a resistor $R_{11}$ to the output of amplifier $A_3$ and its non-inverting input connected to the junction of two resistors $R_{12}$, $R_{13}$ in series between rails 20, 21. A resistor $R_{14}$ is connected between the output of amplifier $A_4$ and its non-inverting input so that amplifier $A_4$ acts as a schmidt trigger circuit providing fast positive-going transitions coinciding with the positive-going transitions of the waveform generated by winding 18.

The four operational amplifiers $A_1$ to $A_4$ preferably form a single integrated circuit component.

The output of amplifier $A_2$ is connected to the RESET input of a D-type flip-flop circuit 22 (e.g. one half of a type 4013 CMOS integrated circuit), which has its C input connected to the output of amplifier $A_4$. The $\overline{Q}$ output of circuit 22 is connected to rail 20 by a resistor $R_{15}$ and also by a resistor $R_{16}$ and capacitor $C_4$ in series. The junction of resistor $R_{16}$ and capacitor $C_4$, which form a low-pass filter, is connected to the D-input of circuit 22. The Q output of circuit 22 is connected by a resistor $R_{16}$ to the rail 20 and is also connected to an output terminal 23.

As will be seen from FIG. 4A, the voltage on the coil 18 falls to a negative peak as the leading protuberance 11 of a pair approaches the pole piece 16 and then rises rapidly towards a positive peak as the minimum air gap position is passed, the zero-crossing occurring just when the gap is minimum. There is then another negative peak followed by a positive peak as the trailing protuberance passes, the zero crossing between these occurring at minimum air gap. Prior to the arrival of the negative-going peak the output of the amplifier $A_1$ is clamped at a voltage close to that of rail 20. As will be seen from FIG. 4B, the output of amplifier $A_1$ rises as a result of the arrival of protuberance 11 and then starts to fall again, but, because of web 13, does not fall to its previous clamped level. The trailing protuberance 12 causes the integrator output to rise again and then fall back to its initial level. As shown in FIG. 4C the amplifier $A_2$ output goes low before the integrator output reaches its first maximum and remains low until after it passes its second maximum. The amplifiers $A_3$ and $A_4$ provide two negative-going pulses ending with the two zero-crossings mentioned above—See FIGS. 4D and 4E. The rising edges of these pulses trigger the circuit 22 to provide the required output (see FIG. 4F).

It will be noted that the whole of the discriminator circuit except the capacitors can be provided in an integrated circuit package, requiring but few external connections.

In the modification shown in FIG. 5, the disc has leading and trailing protuberances 111 and 112 joined by a web 113 as in FIG. 1. In this case, however, additional protuberances 114, 115, 116, 117 are provided on the webbed portion of the disc. The protuberances should be spaced apart by a distance which is large compared with their own size and with the minimum air gap.

Except for the final output stage the modified discriminating circuit is the same as that shown in FIG. 3. Instead of a flip-flop circuit 22, a counter 122 is used (see FIG. 6). This counter 122 has its RESET terminal connected to the output of amplifier $A_2$ and its CLOCK terminal connected to the output of amplifier $A_4$. The former amplifier applies a reset input to the counter 122 except when a web is passing the pole piece. During this non-reset period the counter 122 counts pulses from amplifier $A_4$ which coincide with the passing of the individual protuberances.

The modified arrangement of FIGS. 5 and 6 may be used in an electronic ignition system to provide a coarse indication of the crankshaft position, a phase-locked loop or similar arrangement being employed to fit a fixed number of "fine" resolution pulses between successive "coarse" pulses.

The disc shown in FIG. 5 may be modified by the addition of extra pieces of web 111A and 112A shown in dotted lines in FIG. 5, so that the protuberances 111 and 112 are spaced from the ends of the web portion. This ensures that fringing flux end effects do not result in the flux failing to reach a clearly defined maximum, (causing a zero-crossing in the winding output), as the peak of the first protuberance passes the pole piece.

I claim:

1. A variable reluctance position transducer comprising a source of magnetic flux, a winding linked with said source in a magnetic circuit which includes a pole piece and a relatively movable part, said relatively movable part having a surface, at least one pair of protuberances on said surface spaced apart in the direction of movement of the relatively movable part, and a web of height less than that of the protuberances interconnecting the protuberances, and a discriminating circuit to which said winding is connected, said discriminating circuit including integrating means to which the output of the winding is applied and gating means connected to said integrating means and operating to distinguish between signals produced in the winding when a protuberance passes the pole piece preceded by the web and followed by the web.

2. A transducer as claimed in claim 1, further comprising a zero crossing detector connected to the winding, said gating means receiving inputs from said integrating means and said zero crossing detector.

3. A transducer as claimed in claim 2, in which said gating means includes a comparator having an output and being connected to compare the output of the integrating means with a reference level and an output circuit connected to said comparator output so as to be held in a reset condition when the integrator output is in the quiescent condition, said output circuit being connected to said zero-crossing detector so as to be clocked thereby each time a zero crossing in the appropriate sense occurs.

4. A transducer as claimed in claim 3, in which the output circuit is a D-type flip-flop circuit provided with a feedback connection so that each time the flip-flop circuit is clocked its output changes state.

5. A transducer as claimed in claim 3, in which the output circuit is a counter connected to count pulses produced by additional protuberances on the relatively movable part between a leading protuberance followed by a web and a trailing protuberance preceded by the same web.

6. A transducer as claimed in claim 1, in which said integrating means comprises an operational amplifier having its inverting input connected to one end of the winding by an input resistor and its non-inverting input connected to the other end of the winding, a capacitor connected between the output of the operational amplifier and the inverting input thereof and a bias circuit connected to the inverting input of the operational amplifier and providing a bias current to drive the operational amplifier into a quiescent saturated condition.

7. A transducer as claimed in claim 2, in which said zero-crossing detector comprises the combination of an operational amplifier having an input resistor and a feedback path including a diode and a capacitor whereby the amplifier acts as an integrator for one polarity input and a comparator for the opposite polarity input.

8. A transducer as claimed in claim 1 in which said movable member is in the form of a disc shape so that said surface, said protuberances and said web form the edge of the disc.

9. A variable reluctance position transducer comprising a source of magnetic flux, a winding linked with said source in a magnetic circuit comprising a pole piece and a relatively movable part, said relatively movable part having thereon at least one web portion such that an air gap between relatively movable part and the pole piece is reduced when the web portion is adjacent the pole piece as compared with when the web portion is not adjacent the pole piece, a plurality of protuberances on the web portion whereby the air gap is further reduced whenever a protuberance is adjacent the pole piece, and a discriminating circuit connected to the winding, said discriminating circuit including integrating means to which the output of the winding is applied and providing an output dependent on whether the web portion is adjacent the pole piece, protuberance detector means connected to the winding and providing an output signal each time a protuberance passes the pole piece and an output circuit connected to the integrator means and to the protuberance detector means and acting to count the signals from the protuberance detector means in an interval during which the integrator means output indicates that the web portion is adjacent the pole piece.

10. A position transducer as claimed in claim 9 in which the protuberances are spaced from the ends of the web portion.

* * * * *